Feb. 24, 1970     A. F. DEMING ET AL     3,496,632

METHOD OF MAKING INDUCTION ROTOR

Filed Feb. 21, 1968     4 Sheets-Sheet 1

INVENTORS.
ANDREW F. DEMING
BY LESLIE M. MARDERWALD

Woodling, Krost,
Granger and Rust
ATTORNEYS

Feb. 24, 1970    A. F. DEMING ET AL    3,496,632
METHOD OF MAKING INDUCTION ROTOR
Filed Feb. 21, 1968    4 Sheets-Sheet 2

INVENTORS
ANDREW F. DEMING
BY LESLIE M. MARDERWALD
Woodling, Krost,
Granger and Rust
ATTORNEYS.

INVENTORS
ANDREW F. DEMING
LESLIE M. MARDERWALD
BY Woodling, Krost,
Granger and Rust
ATTORNEYS.

INVENTORS
ANDREW F. DEMING
BY LESLIE M. MARDERWALD
Woodling, Krost,
Granger and Rust
ATTORNEYS United States Patent Office 3,496,632
Patented Feb. 24, 1970

3,496,632
METHOD OF MAKING INDUCTION ROTOR
Andrew F. Deming and Leslie M. Marderwald, Alliance, Ohio, assignors to Alliance Manufacturing Company, Inc., a corporation of Ohio
Filed Feb. 21, 1968, Ser. No. 707,123
Int. Cl. B23p 11/02; H02k 15/02
U.S. Cl. 29—598                                    15 Claims

ABSTRACT OF THE DISCLOSURE

The disclosure relates to a method of making an induction start synchronous run single phase shaded pole electric motor which has a composite rotor including a permanent magnet section and a laminated permeable section with a squirrel cage. The squirrel cage of the laminated section has a very low resistance to establish starting of the motor as an induction motor and acceleration to a quite high induction motor action running speed from which the motor pulls into synchronous speed with a high ratio of pull-in torque relative to the pull-out torque. The low resistance squirrel cage rotor section is made by a slow squeezing of the rotor bars for a good coining of the metal, and using a high ratio of conductor to permeable laminations in the rotor.

The foregoing abstract is merely a resume of one general application, is not a complete discussion of all principles of operation or applications, and is not to be construed as a limitation on the scope of the claimed subject matter.

BACKGROUND OF THE INVENTION

In phonograph motors in recent years there has been increased interest in synchronous motors to drive the turntable in order to achieve an exact speed of reproduction of the sound recorded on the phonograph record. The typical synchronous reluctance motor is used in clock motors, for example, has an extremely low starting and running torque, generally not satisfactory for use in driving phonograph turntables. If the starting torque and driving torque is increased this increases the noise and rumble level in the phonograph mechanism. The rumble includes both 60 Hz. and 120 Hz., for an alternating voltage source of 60 Hz. With the continued interest in greater fidelity it is imperative that the rumble and noise level be kept low and this has created serious problems in attempting to establish sufficient starting and driving torque with a sufficiently low noise level. Costly solutions to this problem have been suggested but they have not been practical for mass-produced reproducing phonograph players, and have only found use in the most expensive professional turntables such as are used for broadcasting and record cutting.

Additionally, where the phonograph motor is to be used in a record changer, as distinguished from a record player, the motor must supply sufficient torque to drive the record changing mechanism which usually incorporates cams or other devices taking considerable load torque. In such case the small synchronous reluctance clock-type motor has been found totally unsatisfactory.

One approach to the solution for a simple and relatively inexpensive phonograph motor was to use a composite rotor having a permanent magnet section plus an induction motor section with a squirrel cage and permeable laminations. The section with the squirrel cage provided the induction motor action for starting and initial acceleration to an induction motor running speed and the permanent magnet section provided a pull-in to a synchronous running speed. However, such motors had difficulty in being fabricated at sufficiently low cost to attract the phonograph industry to adopt this type and additionally had other disadvantages of possible demagnetization of the magnets or at least partial demagnetization to lose strength and hence lose synchronous running torque during the life of the phonograph motor. Additionally, ceramic magnets were attempted to be used but these were sufficiently hard that they could not be drilled to provide the requisite dynamic balancing which typically was dynamic balancing to within 0.00025 maximum ounce inches of unbalanced torque. This necessitated careful balancing of the rotor itself plus balancing of the permanent magnet and of the composite rotor. In using a ceramic magnet which could not be drilled, some other softer material on the end of the magnet had to be supplied so that it could be drilled for dynamic balancing and this added to the cost and complexity of the entire motor. Further in the old style of a ceramic magnet, when a softer material was supplied on the ceramic magnet and it in turn was cemented or adhesively bonded to the induction motor section of the rotor, the adhesive bonding could be broken loose during drilling for the dynamic balancing. Assuming an alternating voltage source of 60 Hz., then 3600 r.p.m. is the synchronous speed for a two-pole motor. Such a two-pole motor is the simplest to construct and hence the most economical. It was found that with the old style of composite rotor using an ordinary squirrel cage section, the induction motor action no load running speed was in the order of 3450 r.p.m. maximum to as low as 3330 r.p.m. With this low an induction motor running speed, the pull-in torque was severely limited because the two-pole permanent magnet had a high slip speed of 150 to 270 r.p.m. relative to the 3600 r.p.m. synchronous speed. Because of this high slip, the pull-in torque was severely limited.

The prior art attempts to increase the pull-in torque to the synchronous run condition included making the motor bigger. This increased the mass and inertia of the rotor, which compounded the problem, because the low induction motor running speed, caused by the high slip, meant that the permanent magnet had more work to do to rapidly accelerate the rotor to the synchronous speed condition.

Where the motor is driving a phonograph turntable, the load on the motor is an appreciable one because the motor is sized to the job to be done in order to produce an economical motor. At the instant of attempted pull-in, then the turntable and record thereon must be accelerated so that the synchronous pull-in torque must supply sufficient torque to drive the record turntable and also to accelerate it at that instant.

In analyzing the problem it was found that the torque was limited by the friction in the bearings which was being increased because the induction motor permeable rotor section was placed on top, hence the solenoid action of the permeable rotor relative to the field structure pulled the rotor down against the thrust bearing. Also where steel mounting plates for supporting the phonograph motor were used, flux was shunted through this steel mounting plate to rob useful flux from the motor and limit the torque. Still further with single-phase motors, the flux is essentially an alternating flux, not a circular rotating flux to produce a circular field, and is an elliptical field produced by the shaded pole sections to give a starting torque. This non-circular field would further limit the induction motor running speed below 3500 r.p.m.

One attempt by the phonograph industry was to use two synchronous reluctance motors of the clock type to provide sufficient torque for driving the phonograph turntable at synchronous speed but this still was not sufficient torque for starting or for changing the records, and an attempt was made to include a third motor of the induction motor type to provide sufficient torque for this starting and record changing. This obviously became very expensive and hence uneconomical solution to the problem.

If in using a composite rotor of induction motor and permanent magnet sections, an attempt is made to increase the excitation on the single-phase winding, then this has the bad effect of increasing the rumble at 120 Hz. for a 60 Hz. excitation source. The reason is that the magnetic field has a frequency twice that of the alternating voltage source and the increased field increases the non-circularity of the field. This non-circularity is considered the reason for the increased rumble at 120 Hz. Additionally, the prior art used the typical induction motor sections which had skewed rotor bars and open slots in the permeable laminations to receive such rotor bars. These decreased the induction motor running speed and hence decreased the available pull-in torque. Still further the typical induction motor rotor section which was used had a relatively small amount of copper or other conductive material relative to the amount of permeable laminations. This was satisfactory when the rotor was used only as an induction motor but has been found to be the wrong approach when used in a composite rotor to give induction starting and synchronous run characteristics.

The invention may be incorporated in the method of manufacturing an induction motor action rotor having a permeable core with bar apertures and a squirrel cage comprised of end rings and rotor bars, said method comprising the steps of inserting the rotor bars in the core bar apertures and the respective apertures in the end rings, lightly and imperfectly staking the ends of the rotor bars to the end rings with crevices therebetween, soldering the rotor after the first staking to obtain a solder bond in the crevices caused by the imperfect staking between the rotor bars and the end rings, and compressing with a considerably larger axial force on the ends of the rotor bars to completely stake the rotor bars into the end rings for a very low resistance squirrel cage.

Other objects and a fuller understanding of this invention may be had by referring to the following description and claims, taken in conjunction with the accompanying drawings, in which:

DESCRIPTION OF THE PREFERRED EMBODIMENT

The hereinafter described preferred embodiment is not to be taken as limiting on the invention, the invention only being limited by the hereinafter appended claims.

Figure 3:
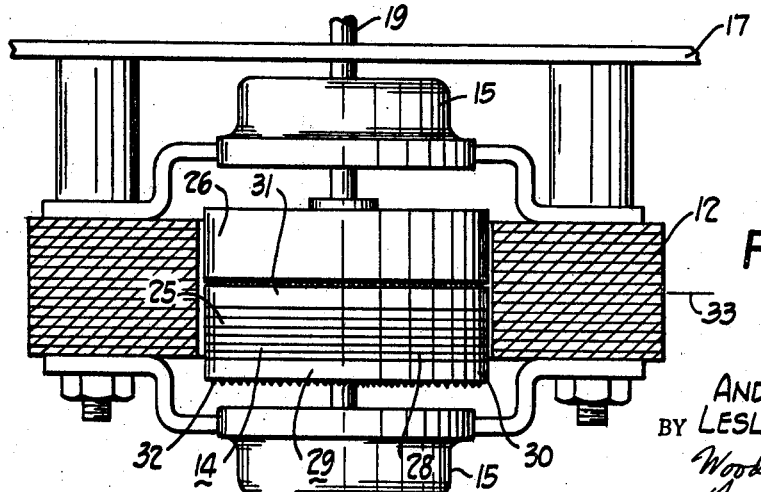
FIGURE 3 is an enlarged end elevational view of the motor of FIGURE 1.
Figure 4:
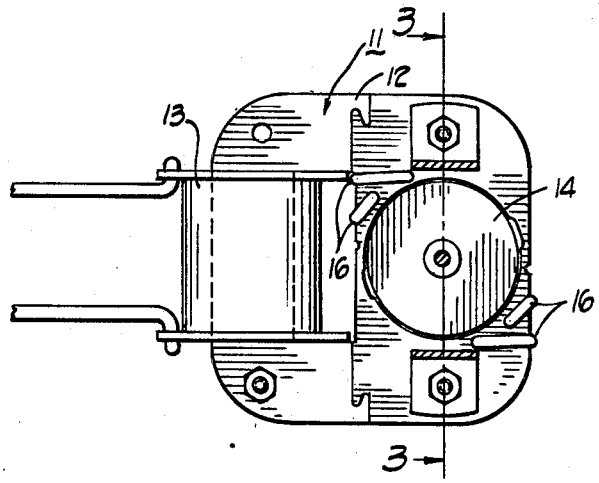
FIGURE 4 is a sectional view of the motor taken on the line 4—4 of FIGURE 2.

The FIGURES 1, 2, 3 and 4 show a phonograph motor 11 which incorporates the invention. This phonograph motor 11 has a permeable field structure 12, winding means 13, a composite rotor 14 and bearing means 15 to journal the rotor 14. The field structure 12 establishes a two-pole magnetic field, as best shown in FIGURE 4, which is excited by the single-phase winding 13. The field structure 12 has shading coils 16 to establish a shaded section of each of the two poles to establish a starting torque for the rotor 14. The motor 11 is dependably supported from a mounting plate 17 which is made of some non-magnetic material, for example, aluminum.

Figure 1:
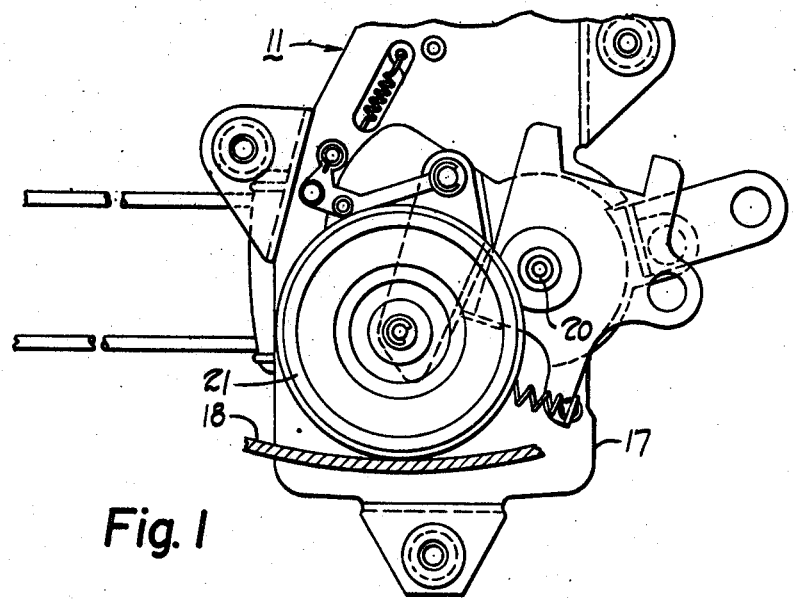
FIGURE 1 is a plan view of a phonograph motor incorporating the invention.
Figure 2:
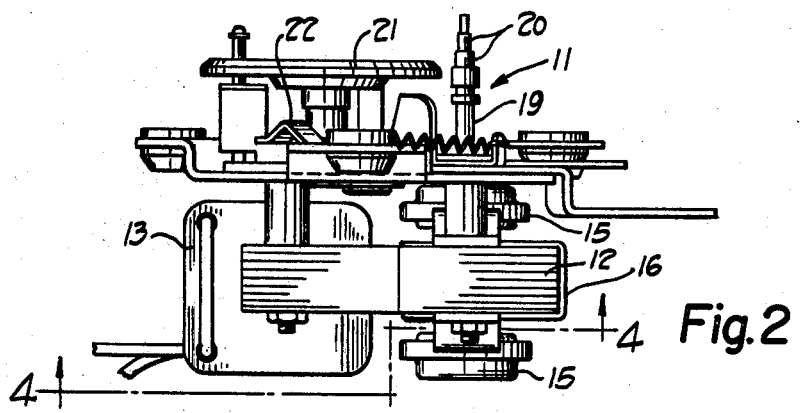
FIGURE 2 is a front elevation of the motor of FIGURE 1.

The phonograph motor 11 is shown as one providing plural speeds to a turntable 18 indicated partially in FIGURE 1. The motor rotor has a shaft 19 journalled in the bearings 15 and the upper end of this shaft 19 has a plurality of steps 20. An idler wheel 21 engages any selected one of these steps 20 and also the inner dependent rim of the turntable 18. The idler wheel 21 is moved vertically by a cam mechanism 22 for selected engagement with any one of the plural steps 20. The FIGURE 3 shows the two bearings 15 which journal the shaft 19 vertically and the lower bearing 15 is a thrust bearing to carry the weight of the rotor and shaft.

The FIGURE 3 also shows the composite rotor 14 which includes first and second sections 25 and 26. The first section 25 is an induction motor action section and the second section 26 is a permanent magnet section. The first section 25 includes a group of permeable laminations 28 and a squirrel cage 29. The squirrel cage 29 includes end-conductive discs 30 and 31 plus conductive rotor bars 32, the ends of which are staked to the conductive discs 30 and 31 and are visible in FIGURE 3. The rotor bars 32 pass through closed slots or apertures in the permeable laminations 28. Also in this preferred embodiment the rotor bars 32 are parallel to the shaft axis rather than being skewed as is conventional induction motor practice. In this preferred embodiment the total axial thickness of the permeable laminations 28 is 0.150 inch and the axial thickness of each of the end rings or discs 30 and 31 is 0.100 inch. This makes a total axial thickness of the end rings approximately 133% that of the axial thickness of the permeable laminations 28, which together with the conductive rotor bars 32 provides a very low resistance rotor relative to the resistance of the permeable laminations 28, and relative to conventional induction motor practice. With this ratio of conductive material to permeable laminations, and with this conductive material being copper, it is found that the weight and volume of the copper squirrel cage 29 is greater than the weight and volume of the permeable laminations 28. This extremely low resistance squirrel cage 29 provides a very high no-load induction motor action running speed of the rotor 14, as tested with the magnet 26 demagnetized.

The second section 26 of the rotor 14 is the permanent magnet section and includes a cylindrical permanent magnet which is magnetized in this preferred embodiment with two poles. The resultant cooperation between the magnet 26 and the two-pole field structure 12 is such as to provide a synchronous running speed of 3600 r.p.m. for a 60 Hz. alternating voltage supplied to the winding 13. Both the first and second sections 25 and 26 of the rotor 14 are cylindrical and have substantially the same air gap with the field structure 12. The permanent magnet 26 is preferably constructed of a rubber-like material to be soft enough to be drilled into the exposed axial end face of the magnet 26 to provide dynamic balancing. The magnet 26 may be provided by permeable small particles held in or bonded into a rubber-like material so that the entire mass may be permanently magnetized and will have a remanence to establish a permanent magnet. In this preferred embodiment the magnet 26 has an axial dimension of 0.250 inch. The composite rotor 14 has an axial thickness greater than the composite rotor 14 with the field structure 12 lying laterally adjacent approximately ⅞ of the axial thickness of the permanent magnet 26. This means that approximately 1/32 of an inch of the magnet extends axially beyond the field structure 12, and this has been found to provide the maximum no-load induction motor action running speed. The field structure 12 lies laterally adjacent all of the permeable laminations 28 of the rotor first section 25 and laterally adjacent the upper end ring 31 plus laterally adjacent about ⅞ of the permanent magnet 26. This configuration has been found to provide the maximum no-load induction motor action running speed.

In this preferred embodiment the permanent magnet 26 is located physically at only one end of the laminated rotor section 25 and as shown is vertically above this laminated section 25. By this construction the center line of the permeable laminations 28 lies vertically below a lateral center line 33 of the field structure 12, which center line 33 is perpendicular to the axis of the shaft 19. With this construction, the solenoid action of the rotor laminations 28, as the winding 13 is energized, attempts to pull the laminations 28 toward this lateral center line 33 of the field structure 12. The net result of this solenoid action is a tendency to lift the rotor 14 which reduces the effective weight on the lower thrust bearing 15 and thus reduces the frictional bearing losses to improve the induction motor action no-load speed.

The motor 11 is usable in high quality phonograph motor drives even though the motor is economical to produce. To achieve this high quality, the rotor 14 may be dynamically balanced to within 0.00025 ounce inches of unbalanced torque. This may be accomplished by dynamically balancing the laminated first section of the rotor 25, with balancing holes drilled on both axial ends thereof. Next the rubber-like magnet material 26 may be cemented to one end of the rotor section 25 and again the entire composite rotor 14 dynamically balanced by drilling on the exposed axial end face of the rubber-like magnetic material 26. This rubber-like material may next be permanently magnetized, preferably so that the hole of the dynamic balancing is on a radial line from the shaft 19 which radial line is perpendicular to the north-south direction of the permanent magnetism in the magnet 26.

OPERATION

Figure 6:
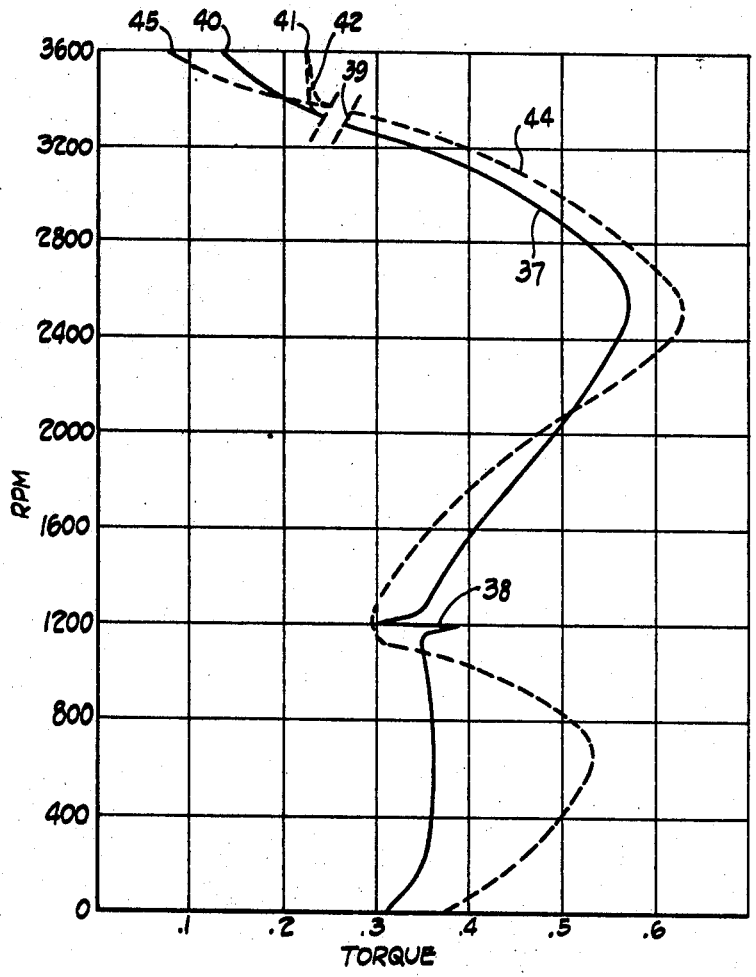

FIGURE 6 shows a curve of speed in r.p.m. vs. torque in ounce inches. This curve 37 is not a plot of speed vs. torque to a constant load, instead it is obtained by variably loading the rotor shaft on a prony brake or dynamometer device to determine the torque at the various speed settings. This curve 37 shows that the starting torque is in excess of .3 ounce inches and increases slightly to the 1200 r.p.m. speed point whereat the rotor does exhibit a tendency to attempt to lock in at this subharmonic synchronous speed. This jump in the curve is shown at numeral 38. The torque increases again to a maximum of about .575 ounce inches at a speed of about 2600 r.p.m. The torque then falls off in the characteristic induction motor running speed curve until another discontinuity 39 is reached at about 3300 r.p.m. This is caused by the permanent magnet 26 which attempts to cause pull-in, however, as soon as the pull-in starts, the induction motor action torque decreases and the dynamometer load at that point is sufficiently high to prevent complete pull-in to synchronism. Once this discontinuity point 39 is passed by reducing the load torque requirements, the speed-torque curve 37 becomes erratic to the pull-in point 40 at the synchronous speed of 3600 r.p.m. This pull-in torque point 40 is at about 0.125 ounce inches.

The motor 11 may be designed to operate a phonograph turntable requiring a driving torque of approximately 0.075 ounce inches and hence the motor 11 would give at least a 50% safety factor of excess torque to drive the turntable 18 at synchronous speed. The FIGURE 6 also shows that the load will stay in synchronism until a pull-out torque point 41 is reached at which time the speed will drop until the pull-out torque curve 42 merges with the curve 37 at about 3350 r.p.m. The motor 11 will then sustain a much greater load acting as an induction motor and this greater output torque may be profitably utilized, for example, if the phonograph motor 11 is used in a record changer wherein the record changing cycle requires considerably higher torques than the running torque of just the turntable 18 alone. It will be noted that the pull-in torque point is approximately ⅔ of the pull-out torque point 41, and this is an exceptionally high ratio of pull-in to pull-out torque, especially where the excitation of the winding means 13 is such that the field structure 12 is operated below the knee of the saturation curve. FIGURE 6 also shows another curve 44 of the typical prior art curve wherein the pull-out torque point 41 remains the same yet the pull-in torque point 45 is considerably less than 50% of the pull-out torque point 41, and is only about ⅔ of the pull-in torque 40 achieved by applicants' present invention.

Figure 5:
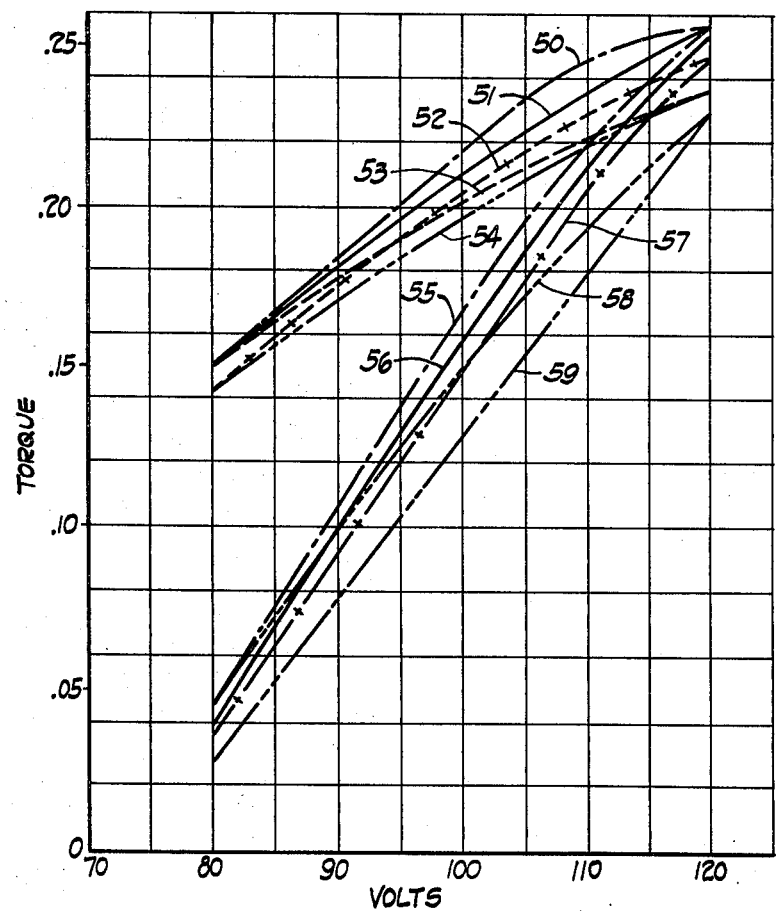
FIGURES 5, 6 and 7 are graphs of operating characteristics of the motor.

FIGURE 5 illustrates a family of curves 50–59 of pull-in and pull-out torque vs. applied excitation voltage. This family of curves 50–59 show torque plotted against the excitation voltage on the winding 13. Curves 50–54 are curves of pull-out torque plotted against excitation voltage and curves 55–59 are pull-in torque plotted against excitation voltage. These curves 50–59 show the effect of shading coil size, namely wire gauge of the shading coils 16. FIGURE 4 shows that two such shading coils 16 are used on each pole. Curves 50 and 55 are using wire gauge sizes 9½ and 9½. Curves 51 and 56 are using wire gauge sizes 9 and 9. Curves 52 and 57 are using wire gauge sizes 8½ and 8½. Curves 53 and 58 are using wire gauge sizes 10 and 10, and curves 54 and 59 are using wire gauge sizes 10 and 13. In typical induction motor practice the two shading coils are made of different size wire, with the shading coil circumscribing a greater extent of the pole piece being of smaller gauge, that is, a higher gauge number of wire. Using wire gauge of 10 and 13 was common practice in prior art induction motors and the curves 54 and 59 show the pull-out and pull-in torque respectively of such a composite rotor used with these wire gauges. In general the pull-out and pull-in torque was improved with increased gauge of wire up to 9½ gauge for each of the two shading coils. This is shown in curves 50 and 55. However, increasing the shading coil size to number 9 gauge on each gave a reduced torque for both the pull-in and pull-out and hence in this preferred embodiment the number 9½ gauge wire for both shading coils on a pole piece is preferred. Also in the case of the 9½ wire gauge shading coils of curves 50 and 55 it is found that the induction motor action no-load running speed, with the magnet 26 removed, is about the highest of all curves, namely 3475 r.p.m.

By the use of the non-magnetic motor mounting plate 17, there is no flux shunted through this mounting plate to rob the rotor 14 of its operating flux and this increases the induction motor action no-load running speed. By placing the magnet 26 on top, the solenoid action on the permeable laminations 28 tends to lift the entire rotor 14 toward the center line 33 of the field structure 12 to reduce the frictional load on the lower thrust bearing 15 and thus also increase the induction motor action no-load running speed. The high ratio of axial thickness of the copper end rings 30 and 31 relative to the axial thickness of the permeable laminations 28 establishes a very low resistance rotor which also achieves a very high induction motor action no-load running speed.

Figure 7:
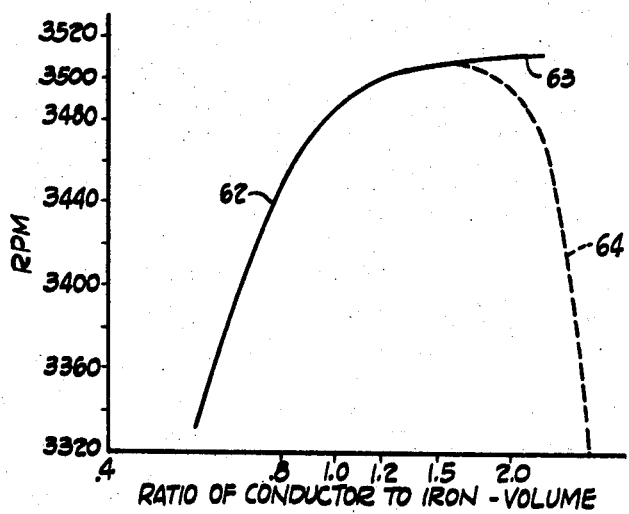

FIGURE 7 is a plot of a curve 62 of speed versus a volume ratio of conductor to iron or permeable laminations in the induction motor rotor section 25. This curve 62 of FIGURE 7 shows the maximum no-load induction motor running speed of the rotor 25 alone without the magnet 26, or with the magnet 26 present in the composite rotor 14, but unmagnetized. The reason why the magnet 26 has to be unmagnetized or absent is because if it were present then this maximum induction motor running speed would not be capable of ascertainment, because the motor would pull-in to synchronism as shown by the pull-in point 40 of curve 37 in FIGURE 6.

The curve 62 is obtained by taking a plot of many different motors of different kinds of rotors with varying ratios of conductor to permeable laminations in the rotor section 25. As more conductive end rings, for example of copper, are provided on the rotor stack, the fewer permeable laminations of steel for example, are used for a given stack height. The typical induction motor rotor is one which would have a ratio of about .4 to .7 of conductor to iron, by volume, and the curve 62 shows that such motor would have a no load running speed in the order of 3300 to possibly as high as 3400 r.p.m. This low running speed is because of the relatively high resistance squirrel cage caused by a minimum amount of copper or other conductor. However, the curve 62 shows that when one reaches a ratio of about 1.0 of conductor to iron, the no-load speed is up in that range which applicants have discovered to be very desirable, namely about 3480 r.p.m. or above. The reason why this is so desirable is that with the higher no-load operating speed the rotor gets up to a speed whereat the permanent magnet 26 will easily pull the rotor into synchronism at 3600 r.p.m. Much depends upon the efficiency of the joint between the rotor bars and the end rings, and it has been found that there is a considerable variation in the ordinary production induction motor rotor which results in considerable variation in resistance and hence considerable variation in the no-load running speed. For the ordinary rotor this is at about 3300 to 3400 r.p.m. range. The preferred embodiment is one wherein the volume ratio of conductor to permeable laminations is about 1.83 as shown by the last point on the curve 62 and this ratio by volume is achieved by an axial length ratio of the copper to the iron of 1.33 to 1. This 1.33 ratio is achieved by two copper end discs on each end, each 0.050 inch thick for a total axial length of 0.200 for the copper. The iron laminations are six in number, each 0.025 inch thick for a total axial thickness of 0.150 inch.

The above examples are with a field structure stack of laminations of ½" height. If the total effective length of the composite rotor 14 is kept at about ½" in order to cooperate with this field structure 12, then as one increases the ratio of conductor to iron, this means that more copper end rings are supplied and fewer permeable laminations are supplied. Carrying this to an extreme, one finds that the curve 62 will no longer be generally asymptotic to the 3600 r.p.m. synchronous speed as shown by the extrapolation 63 of curve 62, instead it will fall rapidly as shown by the dotted portion 64. The reason for the rapid drop off portion 64 is because with fewer laminations in the rotor these laminations rapidly become saturated trying to carry sufficient flux. As an example, with a ratio of 3.33 to 1 of conductor to iron and using only two laminations for a total of 0.050 inch axial thickness of iron, the speed was down to 2900 r.p.m. Also the rotor weighs about the same so that the windage and friction losses would be about the same and with these saturated rotor laminations, the no-load induction motor action speed is down considerably from the desired speed of about 3500 r.p.m.

This establishes a rotor 14 which has a low mass relative to the pull-in torque. This achieves a high no-load induction motor action running speed of about $35/36$ of the synchronous speed and also achieves a high ratio of pull-in to pull-out torque, namely approximately 2/3.

Utilizing the same motor and placing the magnet on the top rather than on the bottom, the motor actually has a higher pull-in torque. This shows that the frictional drag in the lower thrust bearing actually decreases the pull-in torque. With the magnet on the top, the rotor 14 tends to lift off the bearing. With the magnet on the bottom, the rotor is actually pulled down to the bearing and hence the axial thrust is twice what one would expect and hence this affects the no-load running speed. The closed slots rather than open slots in the permeable laminations and also the axially parallel rotor bars both improve the no-load running speed. Current practice for single phase shaded pole induction motors is to use an excitation which is considerably above the knee of the saturation curve. This heavy excitation increases the noise and especially the rumble. In this preferred embodiment the excitation on the winding 13 is such that the field structure is excited below the knee of the saturation curve. The low excitation gives a low rumble at 120 Hz., with 60 Hz. excitation voltage. Another advantage of the present construction is that the low resistance of the squirrel cage gives the highest no-load running speed and also the lowest amount of solenoid action pulling the rotor into the center of the field structure 12. An explanation of this is that one has observed a conductive ring placed in a heavy and concentrated field and such field will actually throw this conductive ring out of the field, or else will repel and support it physically above any physical support structure in defiance of gravity. Conversely, if a magnetically permeable ring is placed in this heavy field it will be attracted to the core concentrating the field. Now because the composite rotor 14 has a much smaller amount of permeable laminations and a much greater amount of conductive squirrel cage than the ordinary induction motor rotor, the conductive ring effect is increased where it is attempted to be thrown out of the field and the solenoid action of attraction to the center line is reduced, thus reducing the overall total solenoid action and producing the highest no-load running speed.

The permanent magnet 26 is shown as having an axial dimension of 0.250 inch. This has been found superior to a thinner magnet of about $3/16$ inch thickness and one theory as to why this is so is because the field established by the field structure 12 is not circular. Assume for the moment that this was a circular field, such as is established in many three-phase motors. With the circular field and no load on the rotor, the permanent magnet 26 would establish the rotor directly in phase with the rotating field. As the load is increased, the rotor slips backward in phase to carry this increased load but is still in synchronism. Now with a weaker magnet such as would be imposed with a thinner magnet, the phase slippage is more. Now take the actual case of the present motor which is not a circular field because it is not three phase, instead it is a shaded pole field with the shaded section being weaker than the main pole flux. At these weaker shaded sections the weaker magnet slips even more from its synchronous position and then pulls back in closer to proper phase position at the main pole section. This is a modulation of the angle of phase lag, especially as the load torque nears the pull-out torque point 41. As this load torque requirement increases there is more flutter of the phase position and this shows up as 120 Hz. rumble in the phonograph. Now with a thicker magnet and hence a stronger magnet, there is not as much modulation of the angle of phase lag and hence there is less total rumble in the phonograph motor 11. If the shaft is bent or the rotor is out of balance, then this provides rumble at 60 Hz., with a 60 Hz. energizing voltage. However, the magnetization is at 120 Hz. and it has been found that the thicker magnet reduces the rumble at 120 Hz. hence the reasoning is that this thicker magnet does definitely affect the total flux available for operation of the rotor 11.

Figure 8:
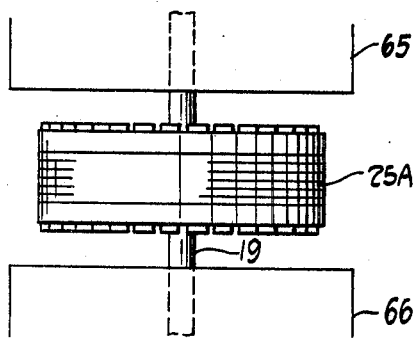
FIGURES 8 and 10 show sequential steps in the method of making the rotor.
Figure 9:
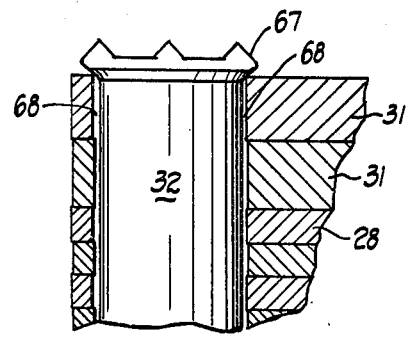
FIGURES 9, 11, 12 and 13 show the rotor in various stages of manufacture.
Figure 12:
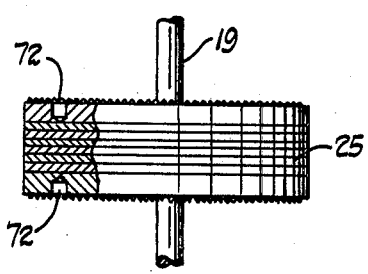
Figure 13:
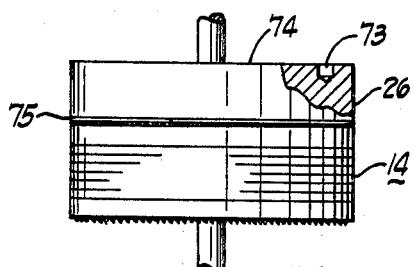

FIGURES 8 through 13 show a method of producing the composite rotor 14, FIGURE 13, which method is a preferred embodiment for forming this rotor. FIGURE 8 shows the induction motor rotor section 25A only, on the shaft 19 as installed in a press represented by a hammer 65 and an anvil 66. The hammer 65 is moved axially downwardly and a central aperture therein and in the anvil 66 will embrace the shaft 19 to maintain the press force parallel to the axis. Preferably this is a light force in the order of 800 pounds, for example, which does little more than loosely stake the ends of the rotor bars into a temporary head 67. This imperfect staking of the rotor bars 32 does not radially expand the ends of the rotor bars 32 within the copper laminations or end rings 30 and 31, and hence crevices 68 remain between the ends of the rotor bars 32 and the copper laminations 30 and 31. In fact this light staking is preferably done so that the laminations are slightly loose and merely held together by the temporary heads 67. This is as shown in FIGURE 9. One typical example of the rotor bars is that they might be number 9½ gauge or a diameter of about 0.107 inch. The rotor bar apertures may be 0.115 inch in both the copper and iron laminations. This clearance is necessary for efficient insertion of the rotor bars in these apertures during assembly.

Next the partially assembled rotor section 25B is soldered and one satisfactory method is to dip solder these rotors by rolling them on a horizontal axis into a molten solder bath with flux floating on the top thereof. They are preferably rolled into the solder bath almost to the shaft 19 and the molten flux will flux the surfaces of the crevices 68 so that solder is deposited in these crevices 68.

Figure 10:
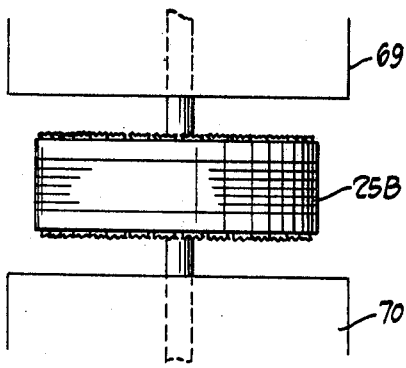
Figure 11:
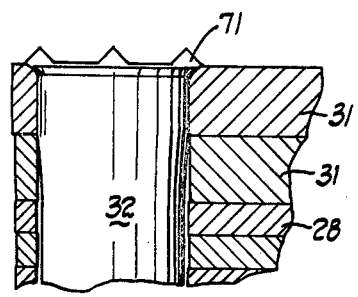

Next, FIGURE 10 illustrates that the rotor section 25B is placed in another press illustrated by a hammer 69 and an anvil 70. It has been found that it does not matter how quickly the force is applied in the first press 65–66, so long as it is a relatively light force. Accordingly, an ordinary punch press with a fly wheel and an eccentric or crank may be used to deliver a light blow to peen over or stake the temporary heads 67. In such case the force is only applied through about ⅟₆₀ of a revolution of the press and the press might run at 60 r.p.m., so that the force is applied for only ⅟₆₀ of one second. Now, however, in the press 69–70 of FIGURE 10 a much greater force is employed and it is applied slowly. One satisfactory way is to utilize a hydraulic press which requires a definite length of time, for example two seconds, for the hydraulic fluid to move into a cylinder and establish an axial force on the rotor section 25B. Also a much greater force for example 18 tons, is applied by the press 69–70. In one typical rotor, 18 rotor pins were used, hence this is a force of one ton per rotor bar, and because of the small area of each end of the rotor bar this is a pressure in the order of 100 tons per square inch. This high pressure results in the construction shown in FIGURE 11 wherein the staked ends of the rotor bars 32 are formed into a permanent head 71 which has radially expanded the ends of the rotor bars 32 and it has also been found that this radially expands the small area of the end conductor disc 31 which is radially outboard of the respective rotor bar 32. The radial expansion of each end of the rotor bars 32 appears to coin the metal of the rotor bars into the metal of the end rings 30 and 31, at least for the outermost end ring. This may or may not be an alloying of the two metals together with the solder metal but in any event this definite coining under high pressure has been found to achieve an extremely low resistance squirrel cage 29. It is this very low resistance squirrel cage relative to the resistance of the permeable laminations 28 which establishes the high no-load induction motor running speed as shown by the curve 62 of FIGURE 7.

FIGURE 12 illustrates the completed rotor section 25 which is then dynamically balanced by drilling axial holes 72 on each axial end of the rotor section 25. This will permit dynamic balancing to within 0.00025 ounce inches of unbalanced torque or movement. Next FIGURE 13 shows that an adhesive 75 is applied to one end of the rotor section 25 and the permanently magnetizable rubber-like material 26 is adhered thereto. This will later become the permanent magnet 26. Now this composite rotor 14 is again dynamically balanced and if necessary, balancing holes 73 are drilled into the exposed axial end face 74 of this magnetizable material 26. This again establishes the composite rotor 14 as being one which is dynamically balanced within close limits. Next the rubber-like material 26 may be permanently magnetized in a direction transverse to the shaft 19, and preferably in a direction perpendicular to a radius to the balancing hole 73. Accordingly, the balancing hole 73 will have a minimum effect on the strength and uniformity of the permanent magnet, which will be a two-pole magnet in this preferred embodiment. With this assembly the composite rotor 14 is now ready for assembly into the complete phonograph motor 11.

If the pressure used on the second press 69–70 is applied rapidly, for example with a fly wheel and eccentric press, and applied in a time span of approximately ⅟₆₀ of a second, this was found to give rotors with erratic results. Forces as much as 25 tons were tried on such a press in order to try to get a low resistance rotor which would consistently give a high induction motor running speed of about 3500 r.p.m. However, even with this high force of 25 tons which would exceed 120 tons per square inch on the ends of the rotor bars, there was found to be a variation in no load speed of from about 3400 to 3500 r.p.m. This is a two to one variation in slip, namely from 100 to 200 r.p.m. slip. Correspondingly, this affected the pull-in torque from about 0.1 down to 0.05 ounce inches. One reason for this is that the steel laminations 28 seem to axially expand after the rapidly applied force was released and this expansion broke the bond between the rotor bars and the end rings. This expansion may not have been wholly within the steel laminations, instead it may have been partly in the oxide or insulation coating customarily supplied on the steel laminations to reduce eddy currents. In any event, this expansion would occur which broke the bond and this apparently is the reason for the large variation in slip speed and hence large variation in pull-in torque. This slowly applied heavy force of the preferred embodiment has been found to give far more consistent results in the low resistance of the rotor, the high no load running speed, the minimum slip and the maximum pull-in torque.

Although this invention has been described in its preferred form and preferred practice with a certain degree of particularity, it is understood that the present disclosure of the preferred form and preferred practice has been made only by way of example and that numerous changes in the details of construction and the combination and arrangement of parts and steps may be resorted to without departing from the spirit and the scope of the invention as hereinafter claimed.

What is claimed is:

1. The method of manufacturing an induction motor action rotor having a permeable core with bar apertures and a squirrel cage comprised of end rings and rotor bars,
   said method comprising the steps of, inserting the rotor bars in the core bar apertures and the respective apertures in the end rings,
   lightly and imperfectly staking the ends of the rotor bars to the end rings with crevices therebetween,
   soldering the rotor after the first staking to obtain a solder bond in the crevices caused by the imperfect staking between the rotor bars and the end rings,
   and compressing with a considerably larger axial force on the ends of the rotor bars to completely stake the rotor bars into the end rings for a very low resistance squirrel cage.

2. The method as set forth in claim 1 including the step of pre-tinning the rotor bars before inserting the rotor bars in the apertures.

3. The method as set forth in claim 1 including the step of maintaining an axial force on the rotor bars during the first staking step to maintain the rotor bars axially parallel.

4. The method as set forth in claim 1 wherein said second compressing step is accomplished at a slower rate than the first axially compressing step.

5. A method as set forth in claim 1 wherein said second compressing step is with a sufficient force to coin the rotor bars into the metal of the end rings.

6. The method as set forth in claim 1 including the step of maintaining an axial force on the rotor bars during the second compressing step to maintain the rotor bars axially parallel.

7. A method as set forth in claim 1 including dynamically balancing the rotor by drilling on an axial end thereof.

8. The method as set forth in claim 1, including soldering the rotor after the first staking to obtain a solder bond in the crevices caused by the imperfect staking between the rotor bars and the end rings.

9. A method as set forth in claim 8 wherein said second compressing step is with a sufficient force to coin the solder metal in the crevices into the metal of the rotor bars and of the end rings.

10. A method as set forth in claim 1 wherein the induction motor rotor is a part of a composite rotor of an induction start, synchronous run motor, and including the steps of fastening a permanently magnetizable material axially on one end of the rotor, and permanently magnetizing said magnetizable material.

11. A method as set forth in claim 10 including dynamically balancing the induction motor rotor section by drilling on an axial end thereof before the magnetizable material is fastened to the end of the rotor, and dynamically balancing the composite rotor by drilling axially into the exposed end face of the magnetizable material.

12. A method as set forth in claim 11 wherein the permanently magnetized direction of the magnetizable material is perpendicular to a radius to the counterbalance drill hole in the magnetizable material.

13. The method as set forth in claim 1 wherein the second compressing step radially expands the ends of the rotor bars to form a good electrical connection with the end rings.

14. The method as set forth in claim 1 wherein the second compressing step radially expands that portion of the end rings lying radially outwardly of the rotor bars to form a good electrical connection between the rotor bars and the end rings.

15. The method as set forth in claim 1, wherein the rotor is part of a composite rotor for an induction start synchronous run electric motor,
said induction motor section having permeable laminations with closed bar apertures,
pre-tinning the rotor bars before insertion into the apertures,
said first staking being lightly axially compressing the ends of the rotor bars to lightly and imperfectly stake the ends of the rotor bars to the end rings with crevices therebetween while maintaining an axial force to maintain said rotor bars axially parallel,
dip-soldering the rotor to obtain a solder bond in the crevices caused by the imperfect staking between the rotor bars and the end rings,
the second compressing step being accomplished slowly relative to the first staking to coin the rotor bars into the metal of the end rings for a very low resistance squirrel cage,
dynamically balancing the induction motor rotor section by drilling on both axial ends thereof;
cementing a permanently magnetizable rubber-like material axially on one end only of the rotor,
dynamically balancing of the composite rotor by drilling axially into the exposed end face of the rubber-like material,
and permanently magnetizing said rubber-like material along a transverse axis with the counterbalance drilling hole therein lying perpendicular to said transverse axis.

References Cited

UNITED STATES PATENTS 2,432,819 12/1947 Schumacker.
2,499,390 3/1950 Joy _____ 29—598 X
2,545,527 3/1951 Maxwell _____ 29—470.5

JOHN F. CAMPBELL, Primary Examiner

CARL E. HALL, Assistant Examiner

U.S. Cl. X.R.

29—470.5, 509, 522; 310—42, 211